United States Patent [19]

Schulten

[11] 4,013,781
[45] Mar. 22, 1977

[54] PROCESS FOR OBTAINING HYDROGEN AND OXYGEN FROM WATER USING IRON AND CHLORINE

[75] Inventor: Rudolf Schulten, Richterich, Germany

[73] Assignee: Rheinische Braunkohlenwerke AG, Cologne, Germany

[22] Filed: July 12, 1974

[21] Appl. No.: 488,189

[30] Foreign Application Priority Data

July 14, 1973 Germany .......................... 2336017

[52] U.S. Cl. .............................. 423/579; 423/658
[51] Int. Cl.² ....................................... C01B 13/00
[58] Field of Search .......... 423/493, 472, 579, 416, 423/498, 481, 633, 658

[56] References Cited

UNITED STATES PATENTS

| | | | |
|---|---|---|---|
| 846,657 | 3/1907 | Frolich | 423/493 |
| 1,511,646 | 10/1924 | Weaver | 423/472 |
| 1,880,505 | 10/1932 | Smith | 423/498 |
| 2,155,119 | 4/1939 | Ebner | 423/604 |
| 2,490,587 | 12/1949 | Fontana et al. | 423/579 |
| 2,867,524 | 1/1959 | Chang | 423/416 |
| 3,291,846 | 12/1966 | Otsuka et al. | 423/502 |
| 3,802,993 | 4/1974 | Von Fredersdorff et al. | 423/579 |
| 3,821,358 | 6/1974 | Interrante et al. | 423/579 |
| 3,842,164 | 10/1974 | Wentorf, Jr. | 423/579 |

Primary Examiner—Earl C. Thomas
Assistant Examiner—Wayne A. Langel
Attorney, Agent, or Firm—Edwin E. Greigg

[57] ABSTRACT

Hydrogen and oxygen are obtained from water using a multi-step circulatory process using iron compounds and chlorine as adjuvants. Using three beds, respectively containing magnesium chloride, iron oxide and cuprous chloride, and by a four-step process involving passing steam through the magnesium bed, carbon monoxide through the iron bed, carbon dioxide through the copper bed, and steam through the iron bed one obtains hydrogen and oxygen as end products and is left with the starting materials in the respective beds. An efficiency of about 60% can be achieved by the process.

5 Claims, 1 Drawing Figure

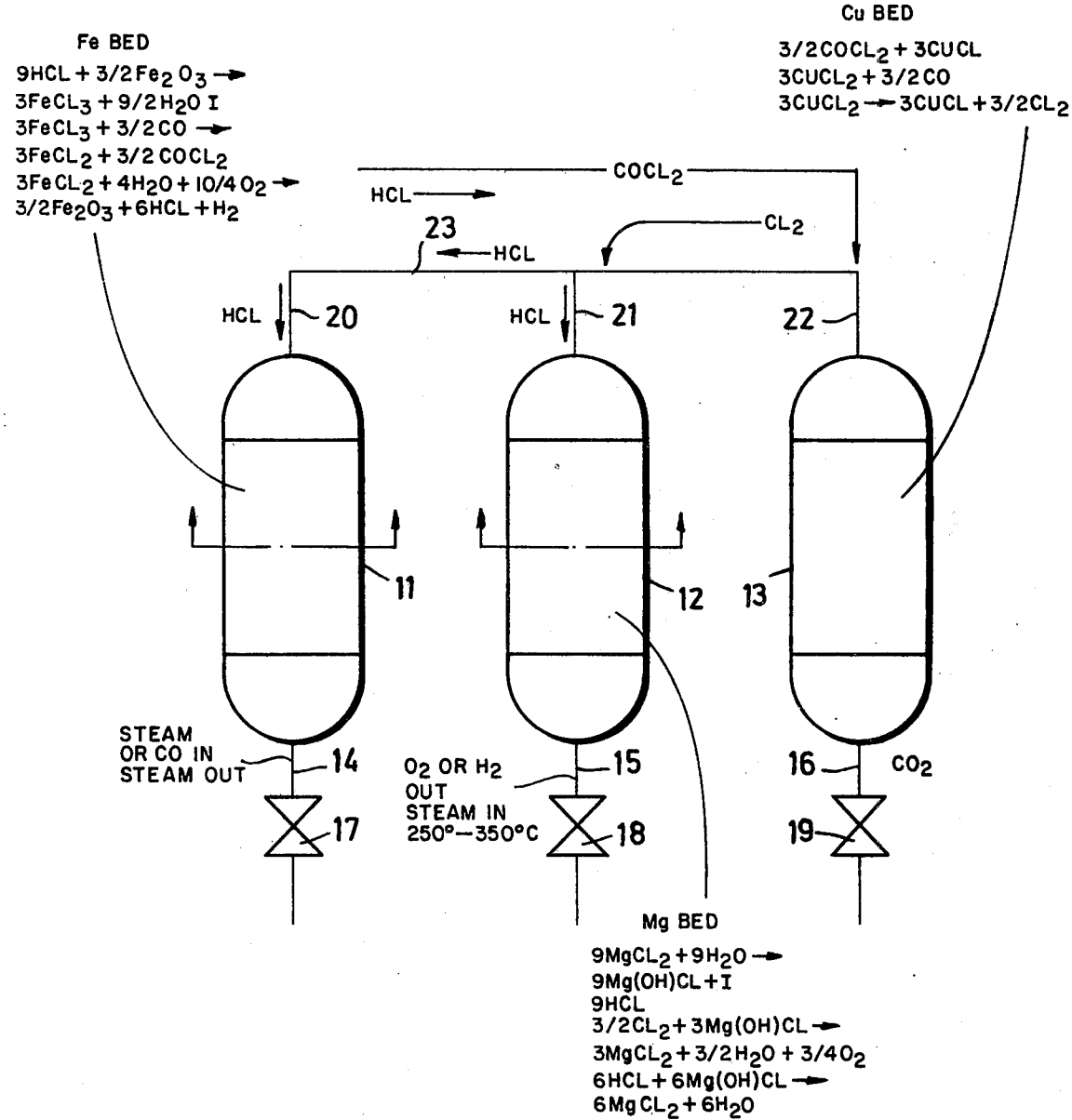

PROCESS FOR OBTAINING HYDROGEN AND OXYGEN FROM WATER USING IRON AND CHLORINE

BACKGROUND OF THE INVENTION

1. FIELD OF THE INVENTION

This invention relates to processes for obtaining hydrogen and oxygen from water.

The manufacture of hydrogen as a future raw material in competition with oil and coal is of great interest. Hydrogen is an energy-containing raw material which can be utilized for combustion and other processes without creating environmental problems. Furthermore, it has the advantage, as has been established by recent research and investigations, that the cost of transportation of hydrogen in gas pipes is similar to that of piping natural gas. These investigations have also shown that this method of energy transportation can be considerably cheaper than the transmission of electricity. The oxygen which is produced simultaneously in the separation of hydrogen from water also finds wide application, for example for the gasification of coal, for the combustion of waste materials, and for the biological treatment of waterways, sewage plant and the like.

2. DESCRIPTION OF THE PRIOR ART

The production of hydrogen and oxygen by electrolysis with a degree of efficiency of at best 25 – 27% is expensive and slow. The above-mentioned degree of efficiency can only be achieved however if one is considering the degree of efficiency of the most favourable reactors and of the most favourable electrolysis. Processes have been developed in which by the addition of for example heavy metal compounds, such as iron chloride or chromium chloride, as adjuvants, water is broken down into hydrogen and oxygen, and the adjuvant material after undergoing changes in a number of reaction steps is reconstituted and can be used again in the process cycle. However, the finding of such processes for the dissociation of water is difficult. Above all, the conventional chemical reactions which are known in the art repeatedly suffer from special problems both in respect of corrosion and also in respect of the rate of production of the end product.

SUMMARY OF THE INVENTION

It has now been found in accordance with the present invention that hydrogen can be obtained from water while substantially avoiding the aforementioned disadvantages, by a multi-step circulatory process using iron compounds and chlorine as adjuvants, in which the circulatory process is carried out in a system of three beds which respectively contain inorganic compounds of magnesium, iron and copper, wherein the process comprises the following steps:

a. passing steam at a temperature of approximately 250° – 350° C through a first bed containing magnesium chloride, and passing the hydrogen chloride produced thereby through a second bed containing iron oxide to convert the iron oxide to ferric chloride;

b. passing carbon monoxide through the ferric chloride converting this to ferrous chloride, and passing the resultant chlorine carried in the carbon monoxide stream through the third bed containing cuprous chloride, converting the cuprous chloride to cupric chloride;

c. passing an inert gas heated to approximately 600° – 800° C through the cupric chloride, producing chlorine and the return of the cupric chloride to cuprous chloride, and passing the dissociated chlorine through the magnesium bed to liberate oxygen and reconstitute magnesium chloride; and d. passing steam heated to approximately 600° – 800° C through the iron bed to convert the ferrous chloride into iron oxide and liberate hydrogen and hydrogen chloride, the oxygen and hydrogen produced in the conversion steps being withdrawn.

The iron bed may contain $Fe_3O_4$ to avoid the need to add oxygen to the superheated steam passed into the iron bed. Alternatively, oxygen may be added.

DESCRIPTION OF THE PREFERRED EMBODIMENT

The hydrogen and oxygen may be produced in a process using just three conversion beds. In the first bed, hereinafter referred to as the magnesium bed, magnesium chloride is used as an adjuvant and this is converted in the described circulatory process to magnesium hydroxychloride as an intermediate product. In the second bed, hereinafter referred to as the iron bed, iron oxide is provided which in the course of the subsequent process steps is converted temporarily either to ferric chloride - iron (III) chloride - or to ferrous chloride - iron (II) chloride. In the third bed, hereinafter referred to as the copper bed, either cuprous chloride or cupric chloride is present in the course of the process steps. These adjuvants are preferably coated in known manner on an inert carrier material, such as alumina $Al_2O_3$.

In the process, firstly, steam at a temperature of approximately 250° – 350° C is blown through the magnesium bed and then on through the iron bed. In the magnesium bed the following reaction takes place:

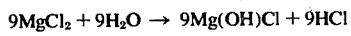

$$9MgCl_2 + 9H_2O \rightarrow 9Mg(OH)Cl + 9HCl$$

and in the iron bed the following reaction takes place:

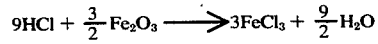

$$9HCl + \tfrac{3}{2} Fe_2O_3 \longrightarrow 3FeCl_3 + \tfrac{9}{2} H_2O$$

Thus, the hydrogen chloride formed in the magnesium bed is passed into the iron bed and there causes the production of ferric (III) chloride. Next, as a second step, carbon monoxide is streamed through the iron bed. This has the effect that chlorine is dissociated from the ferric chloride according to the following reaction and is carried in the carbon monoxide stream into the copper bed:

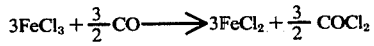

$$3FeCl_3 + \tfrac{3}{2} CO \longrightarrow 3FeCl_2 + \tfrac{3}{2} COCl_2$$

In the copper bed the following reaction takes place:

$$\tfrac{3}{2} COCl_2 + 3CuCl \longrightarrow 3CuCl_2 + \tfrac{3}{2} CO$$

It is significant that the second step involves transportation of chlorine atoms from the iron bed to the copper bed, with the result that ferric chloride is converted into ferrous chloride and in the copper bed cuprous chloride is converted to cupric chloride.

As the next process step, carbon dioxide heated to approximately 700° C – 800° C is passed through the copper bed to produce chlorine according to the following reaction:

$$3CuCl_2 \longrightarrow 3CuCl + \tfrac{3}{2} Cl_2$$

This chlorine is transported by carbon dioxide as carrier gas and is fed into the magnesium bed. There, according to the reaction, $$\tfrac{3}{2} Cl_2 + 3Mg(OH)Cl \longrightarrow 3MgCl_2 + \tfrac{3}{2} H_2O + \tfrac{3}{4} O_2$$

oxygen is set free and by conventional separating processes can be obtained as an end product.

Then, by passing steam heated to approximately 600° – 800° C, possibly with the addition of a small amount of oxygen, through the iron bed the following reaction takes place:

$$3FeCl_2 + 4H_2O + \tfrac{1}{4} O_2 \longrightarrow \tfrac{3}{2} Fe_2O_3 + 6HCl + H_2$$

The gaseous reaction products are fed into the magnesium bed and are converted according to the following equation:

$$6HCl + 6Mg(OH)Cl \rightarrow 6MgCl_2 + 6H_2O$$

with the result that hydrogen and residual steam are produced. From this mixture the hydrogen can be obtained by conventional means. This completes the circulatory process. The materials necessary to start the next process cycle remain in the respective beds.

The magnesium bed has essentially three functions:
1. The creation and storage of hydrogen chloride;
2. The conversion of chlorine with the liberation of oxygen;
3. The separation of hydrogen chloride and hydrogen.

The carbon dioxide used as an inert gas in the third process step and the steam used in the fourth process step are preferably heated to the required temperature by means of heat from a high temperature reactor. The reaction steps can take place under normal pressure. However, if one wishes to obtain the two product gases, hydrogen and oxygen, at pressures greater than atmospheric, then the carbon dioxide and the steam are fed in at a suitably high pressure, for example between 10 and 100 atmospheres.

Instead of $Fe_2O_3$ it is possible to use ferrous-ferric oxide $Fe_3O_4$ as the reaction material in the iron bed. In this case, the addition of oxygen is not necessary when passing the superheated steam into the iron bed.

It is preferable if the process of the present invention is carried out by using a number of the above-mentioned triple bed combinations. In this way a continuous operation can be achieved. Furthermore, the latent thermal energy provided by the thermal capacity of the materials in the beds can then be utilized advantageously through heat transfer with the aid of inert gases. For example, latent heat present in an iron bed can be transferred to an adjacent parallel connected iron bed by a stream of carbon dioxide in order to enable this thermal energy to be used for the corresponding reaction step in the adjacent bed. Likewise, the latent heat of the copper bed can for example be transferred to an adjacent copper bed by a corresponding heat transfer process with the aid of an inert gas.

One embodiment of apparatus for carrying out the process of the present invention is shown in the accompanying drawing. Three beds 11, 12, 13 are provided, each of which has an input/output pipe 14, 15, 16 respectively. A valve 17, 18, 19 is connected into each of these input/output pipes 14, 15, 16.

The iron bed 11, the magnesium bed 12, and the copper bed 13 are connected to one another by conduits 20, 21, 22 and 23. It is of particular advantage that no valves are necessary in the interconnecting conduits 20 to 23 between the beds 11, 12, 13. The inlet/outlet pipes 14, 15, 16 provided with the valves 17, 18, 19 do not come into contact with the corrosive gases, i.e., hydrogen chloride and chlorine. This arises from the process stages described above. Thus, for example, the inlet/outlet pipe 14 of the iron bed 11 is used for feeding in steam and carbon monoxide and extracting steam. The pipe 15 is correspondingly used for example to withdraw oxygen and hydrogen and to feed in steam. The pipe 16 of the copper bed 13 comes into contact with carbon dioxide. Clearly, therefore, as stated above, no corrosive gases come into contact with the pipes 14, 15, 16. The particular advantage arising from this is that it is not then necessary to use corrosion-resistant materials either for these pipes or for the valves which are connected into them. The use of such corrosion-resistant materials is then limited to the beds themselves and to the connecting conduits 20 to 23 between these beds.

If one considers the energy balance of the process steps of the present invention then it is clear that only the dissociation of the chlorine and the conversion of the ferrous (II) chloride with the aid of superheated steam and a little oxygen are endothermic processes, each of which requires approximately 50 kcal/mol $H_2$. All the other process steps are exothermic processes, part of the heat generated being stored in the materials of the beds and part of the heat being extracted with the aid of the flowing gas mixtures. The exothermic heat of these processes can also of course be extracted with the aid of inert gases.

Since in the process of the present invention viewed as a whole a latent heat of about 60 kcal/mol $H_2$ is gained through the extraction of hydrogen and oxygen, the efficiency of this process is of the order of 60%. This represents a considerable improvement in comparison with processes involving electrolysis.

I claim:

1. A process for obtaining hydrogen and oxygen from water in a multi-step circulatory process using iron compounds and chlorine as adjuvants, in which the circulatory process is carried out in a system of three beds which respectively contain inorganic compounds of magnesium, iron and copper, wherein the process comprises the following steps:
   a. passing steam at a temperature of approximately 250°–350° C. through a first bed containing magnesium chloride, and passing the hydrogen chloride produced thereby through a second bed containing ferric oxide to convert the ferric oxide to ferric chloride;
   b. passing carbon monoxide through the ferric chloride converting this to ferrous chloride, and passing the resultant chlorine carried as phosgene in the carbon monoxide stream through a third bed containing cuprous chloride, converting the cuprous chloride to cupric chloride;

c. passing an inert gas heated to approximately 600°–800° C. through the cupric chloride, converting the cupric chloride to cuprous chloride and producing chlorine which is passed through the magnesium bed to liberate oxygen and reform magnesium chloride; and d. passing steam heated to approximately 600°–800° C. through the second bed with the addition of a small amount of oxygen to convert the ferrous chloride into ferric oxide and liberate hydrogen and hydrogen chloride, the oxygen and hydrogen produced in the conversion steps being withdrawn.

2. A process as claimed in claim 1, in which said inert gas is carbon dioxide.

3. A process as claimed in claim 1, in which the magnesium, iron and copper compounds are coated on an inert carrier material.

4. A process as claimed in claim 1, in which a plurality of triple bed combinations are operated with one another in such manner that the heat stored by the thermal capacity of one of said beds is transferred to another of said beds by the gaseous interchange in the process steps.

5. A process for obtaining hydrogen and oxygen from water in a multi-step circulatory process using iron compounds and chlorine as adjuvants, in which the circulatory process is carried out in a system of three beds which respectively contain inorganic compounds of magnesium, iron and copper, wherein the process comprises the following steps:

a. passing steam at a temperature of approximately 250°–350° C. through a first bed containing magnesium chloride, and passing the hydrogen chloride produced thereby through a second bed containing ferrous-ferric oxide to convert the ferrous-ferric oxide to ferrous-ferric chloride;

b. passing carbon monoxide through the ferrous-ferric chloride, and passing the resultant chlorine carried as phosgene in the carbon monoxide stream through a third bed containing cuprous chloride, converting the cuprous chloride to cupric chloride;

c. passing an inert gas heated to approximately 600°–800° C. through the cupric chloride, converting the cupric chloride to cuprous chloride and producing chlorine which is passed through the magnesium bed to liberate oxygen and reform magnesium chloride; and d. passing steam heated to approximately 600°–800° C. through the second bed to liberate hydrogen and hydrogen chloride, the oxygen and hydrogen produced in the conversion steps being withdrawn.

* * * * *